United States Patent
Oiwa et al.

(10) Patent No.: US 6,868,699 B2
(45) Date of Patent: Mar. 22, 2005

(54) GLASS FORMING MOLD

(75) Inventors: Hiroyuki Oiwa, Chiba (JP); Toshihiro Ohashi, Chiba (JP); Yuichi Yamamoto, Kanagawa (JP); Atsuyoshi Takenaka, Kanagawa (JP)

(73) Assignee: Asahi Glass Company, Limited, Tokyo (JP)

( * ) Notice: Subject to any disclaimer, the term of this patent is extended or adjusted under 35 U.S.C. 154(b) by 346 days.

(21) Appl. No.: 10/154,960

(22) Filed: May 28, 2002

(65) Prior Publication Data

US 2003/0005725 A1 Jan. 9, 2003

(30) Foreign Application Priority Data

May 28, 2001 (JP) ........................................ 2001-158881

(51) Int. Cl.[7] ............................................. C03B 40/02
(52) U.S. Cl. ................. 65/374.12; 65/374.13; 65/169
(58) Field of Search ................ 65/26, 169, 374.11, 65/374.12, 374.13; 264/2.3, 337, 338; 249/134, 80

(56) References Cited

U.S. PATENT DOCUMENTS

| 3,589,986 | A | * | 6/1971 | Null | ............................ 205/122 |
| 4,218,243 | A | * | 8/1980 | Kiyonaga et al. | .............. 420/36 |
| 4,382,811 | A | * | 5/1983 | Luscher et al. | .......... 65/374.11 |
| 5,964,916 | A | * | 10/1999 | Segawa et al. | .......... 65/374.11 |

FOREIGN PATENT DOCUMENTS

| JP | 8-59258 | 3/1996 |
| JP | 9-76249 | 3/1997 |
| JP | 9-76250 | 3/1997 |
| JP | 10-330123 | 12/1998 |

OTHER PUBLICATIONS

Machine translation of JP9076250, retrieved from JPO Online, Jul. 31, 2004.*

* cited by examiner

*Primary Examiner*—Steven P. Griffin
*Assistant Examiner*—Carlos Lopez
(74) *Attorney, Agent, or Firm*—Oblon, Spivak, McClelland, Maier & Neustadt, P.C.

(57) ABSTRACT

A glass forming mold comprising a mold having a molding surface, a chromium coating film formed on the molding surface and a silicon oxide film formed on the surface of the chromium coating film.

15 Claims, 1 Drawing Sheet

GLASS FORMING MOLD

BACKGROUND OF THE INVENTION

1. Field of the Invention

The present invention relates to a glass forming mold, particularly to a glass forming mold to be used for forming a glass product such as a panel or funnel for a cathode ray tube for a television.

2. Discussion of Background

A cathode ray tube for a television is prepared by producing a front (image screen) panel and a rear funnel separately, coating a phosphor on the inner surface of the panel, attaching a shadow mask, electrodes, an electron gun, etc., followed by vacuum welding by means of a frit. Especially for a panel, an extremely strict quality control is required with respect to the surface precision of the inner surface of the panel and the state of e.g. surface irregularities, as it serves as an image screen. The panel and the funnel are formed by pressing a high temperature molten glass at a level of about 1,000° C. against a mold. Accordingly, the mold to be used for forming, is required to have properties such as mechanical strength, heat resistance, chemical stability against the high temperature molten glass, etc.

Stainless steel is known as a base material for such a mold, since it is inexpensive and capable of being processed at a high precision and into a complicated shape. It is also known to use a mold having a chromium coating film formed on the surface of stainless steel, in order to impart oxidation resistance.

However, the surface of a chromium coating film on the mold surface is gradually oxidized to form a chromium oxide film, if a high temperature molten glass which contains a large amount of oxidative substances (such as silicon oxide, sodium oxide, potassium oxide, strontium oxide, barium oxide and lead oxide), like a glass for a cathode ray tube, is formed for a long period of time. Consequently, the surface roughness, surface precision, release property from the product, etc. of the mold surface, tend to deteriorate, and high temperature corrosion of the surface of the chromium coating film will proceed. If this corrosion further proceeds, the quality of the glass product will deteriorate, and finally, it will be necessary to change the mold itself. After the change of the mold, it takes some time until glass forming will be stabilized, whereby the productivity decreases remarkably. Accordingly, it contributes substantially to the improvement of the productivity to control the high temperature corrosion of the surface of the chromium coating film. As a method for controlling the high temperature corrosion of the surface of the chromium coating film, a method is, for example, known wherein the surface of the chromium coating film is subjected to anodic oxidation to form a corrosion resistant chromium oxide film on the surface. However, the oxide film obtained by such anodic oxidation has had a drawback that the oxide film itself tends to be thick and peeled as it is used for forming a high temperature molten glass for a long period of time. Further, a method is also employed wherein heat resistant carbon is coated on the surface of the chromium coating film on the mold surface to suppress the corrosion of the chromium coating film, but there has been a drawback such that the effect to suppress the corrosion is rather limited to a short period of time, and the coated portion is susceptible to peeling.

SUMMARY OF THE INVENTION

It is an object of the present invention to provide a glass forming mold, whereby high temperature corrosion scarcely proceeds, peeling scarcely takes place, and a high temperature molten glass can be formed for a long period of time.

The present invention provides a glass forming mold comprising a mold having a molding surface, a chromium coating film formed on the molding surface and a silicon oxide film formed on the surface of the chromium coating film.

Further, the present invention provides a glass forming mold comprising a mold having a molding surface, a chromium coating film formed on the molding surface and a silicon oxide film formed on the surface of the chromium coating film via a chromium oxide film.

The present invention also provides a glass forming mold comprising a mold having a molding surface, and a chromium-plated coating film formed on the molding surface, wherein a chromium oxide film and a silicon oxide film are sequentially formed on the surface of the chromium-plated coating film.

Still further, the present invention provides a process for producing a glass forming mold, which comprises forming a chromium coating film on a molding surface of a mold, and further coating a coating fluid containing a silicon compound, on the surface of the chromium coating film.

The mechanism of corrosion of a chromium coating film is as follows. The surface of the chromium coating film is gradually oxidized, when forming of a high temperature molten glass at a level of 1,000° C. is repeated for a long period of time. Especially in forming a high temperature molten glass, a process of pressing the molten glass by hydraulic pressure against a mold and releasing the pressure, is repeated continuously and regularly in a very short cycle time of about one cycle/10 seconds, whereby contact of the chromium coating film with the high temperature molten glass is repeated, and as mentioned above, corrosion of the surface of the chromium coating film will proceed by the reaction with oxygen in air and the high temperature molten glass, and the surface roughness, surface precision, release property from the product, etc. of the surface of the chromium coating film, will deteriorate. Further, in addition to such a corrosion mechanism of the surface of the chromium coating film, another corrosion mechanism is present such that a powdery double oxide containing chromium and an alkali metal, will be formed, and it has now been found that this double oxide promotes instability of the surface precision of the chromium coating film.

A method to suppress the progress of corrosion of the surface of the chromium coating film by the reaction of the chromium coating film with oxygen in air and with the high temperature molten glass, has been studied in view of the above mechanisms. As a result, it has been found that by coating on the surface of the chromium coating film, a coating fluid (hereinafter referred to as a silicon coating fluid) containing a Si compound (hereinafter referred to as a silicon compound) for forming a silicon oxide film, a chromium oxide film is formed on the surface of the chromium coating film, and a silicon oxide film is further formed on the chromium oxide film. Further, it has been found that such a chromium oxide film and such a silicon oxide film have excellent properties to suppress the progress of corrosion of the surface of the chromium coating film, and they have high adhesive strength and are dense and excellent in stability.

Such a chromium oxide film has been found to have a crystal orientation different from the results of the X-ray diffraction analysis of a chromium oxide film formed when a high temperature molten glass is formed for a long period of time. The mechanism for suppressing the corrosion, is not necessarily clearly understood, but it is considered that by such a difference in the crystal orientation, the excellent properties to suppress the corrosion of the surface of the chromium coating film, will be obtained.

In fact, X-ray diffraction analysis of the chromium oxide film shows that the chromium oxide film has peaks at (012), (104) and (110), wherein, when the peak intensity at (104) is rated at 100, the peak intensity at (012) is at least 50 and the peak intensity at (110) is at least 40.

Further, the above-mentioned silicon oxide film is considered to have high adhesive strength and to be dense and excellent in stability, since Si atoms of the silicon oxide film will bond to oxygen atoms present on the surface of the above-mentioned chromium oxide film. It is further considered that by the formation of such a silicon oxide film, diffusion of oxygen in air into the mold surface is prevented, whereby the excellent properties to suppress corrosion of the chromium coating film will be obtained.

DETAILED DESCRIPTION OF THE PREFERRED EMBODIMENTS

Figure 1:
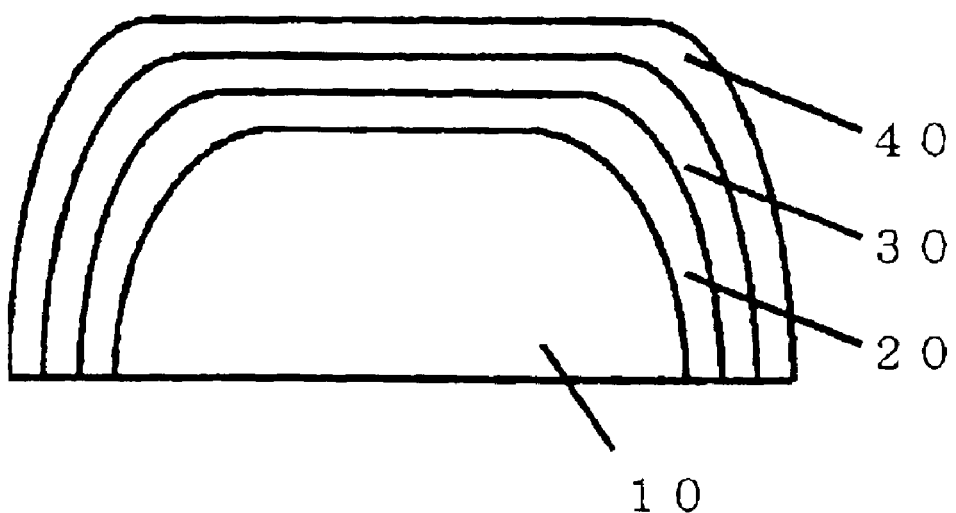
FIG. 1 is a cross-sectional view of a mold for forming a panel glass for a cathode ray tube.

FIG. 1 is a cross-sectional view of a mold for forming a panel glass for a cathode ray tube, as an example of the glass forming mold. A chromium coating film 20 is formed on the molding surface of a mold 10. A silicon coating fluid is coated on the surface of the chromium coating film 20, followed by drying at room temperature, heating, hydrolysis, etc., to form a chromium oxide film 30 on the surface of the chromium coating film 20 and further to form a silicon oxide film 40 on the chromium oxide film 30.

In the present invention, the chromium coating film formed on the surface of the mold, can be formed by a known method. The method is not particularly limited, but specifically, an electrolytic plating method is commonly employed. The thickness of the chromium coating film is preferably from 2 to 200 $\mu$m with a view to preventing oxidation of the base material of the mold and securing the adhesive strength with the base material of the mold.

In the present invention, the silicon compound is not particularly limited so long as it is capable of forming a silicon oxide film by drying at room temperature, heating, hydrolysis or the like. As an example, at least one silicone oil selected from the group consisting of a dimethyl siloxane type silicone oil, a methyl hydrodiene type silicone oil and a silicone oil having H in a Si—H group modified by e.g. an OH group or an epoxy group, may be mentioned. Further, as such a silicon compound, at least one compound selected from the group consisting of a silicon alkoxy compound such as tetramethoxysilane, and a reactive silicon compound such as silazane, can also be suitably employed.

Further, the silicon coating fluid may be composed solely of a silicon compound or may be a mixture of a silicon compound with an inorganic solvent and/or an organic solvent to attain uniform coating. For example, a mixture of a silicon compound with water and an alcohol, is preferably employed. The concentration of the silicon compound may be optionally adjusted depending upon the Si deposition amount of the silicon oxide film, as described hereinafter. However, it is preferably from 1 to 90 mass % in the coating fluid. The alcohol is not particularly limited, and methanol or ethanol can, for example, be preferably employed. To prevent remaining of the solvent, the concentration of the alcohol is preferably from 0.1 to 50 mass % in the coating fluid.

To attain uniform coating, a surfactant may be added to the silicon coating fluid. As such a surfactant, a surfactant of silicone type, nonionic type, cationic type or anionic type, may be used. A surfactant of silicone type or nonionic type can be used particularly preferably.

The method for coating the silicon coating fluid is not particularly limited. For example, a spraying method, a spin coating method or a brush coating method may be mentioned.

After coating the silicon coating fluid, it is preferred to heat the mold. To prevent remaining of the solvent, it is preferred to heat the mold in air at a temperature of from 100 to 800° C. for from 1 to 12 hours.

The thickness of the chromium oxide film preferably ranges preferably from 0.1 to 2 $\mu$m as determined by the observation of the cross-sectional structure of the chromium oxide film by means of SEM. If it exceeds 2 $\mu$m, such is not preferred for the reason of peeling of the oxide film, and if it is less than 0.1 $\mu$m, such is not preferred for the reason that the corrosion resistance deteriorates. The thickness of the chromium oxide film that is formed can be adjusted, for instance, by the heating conditions applied or by the concentration of silicon coating fluid which is applied.

The thickness of the silicon oxide film formed on the chromium oxide film can be measured in the same manner as in the case of the chromium oxide film by means of SEM. The thickness of the silicon oxide film on the chromium oxide film preferably ranges from 0.1 to 2 $\mu$m. However, in this invention, instead of measuring the film thickness by means of SEM, the amount of Si deposited per unit area of the silicon oxide film (hereinafter referred to simply as the Si deposition amount) was measured by means of a fluorescent X-ray apparatus. By this measurement by means of a fluorescent X-ray apparatus, the area for measurement can be increased, whereby there is a merit such that the influence of the surface irregularities of the silicon oxide film can be minimized. The above-mentioned Si deposition amount is preferably from 0.1 to 300 $\mu$g/cm$^2$ in order to suppress corrosion of the surface of the chromium coating film and to prevent deterioration of the surface roughness. Further, it is particularly preferably from 0.1 to 40 $\mu$g/cm$^2$ in order to prevent peeling of the silicon oxide film.

Deterioration of the surface roughness means that the roughness of the surface of the mold becomes non-uniform on appearance. If deterioration of the surface roughness advances, the surface roughness of the formed glass tends to be non-uniform, whereby the quality of the product deteriorates. Accordingly, the timing for the change of the mold is determined by judging whether or not the surface roughness of the mold is uniform as visually observed.

A powdery double oxide containing chromium and an alkali metal will be formed by corrosion of the surface of the chromium coating film by forming a high temperature molten glass for a long period of time. The formed amount of such a double oxide increases as the corrosion of the surface of the chromium coating film advances. The formed amount of such a double oxide varies depending upon e.g. the temperature of glass or the forming time, but is preferably at most 30 ppm. If it exceeds 30 ppm, the surface precision of the mold tends to be unstable, and the quality of the glass product tends to deteriorate.

Further, according to the present invention, a chromium oxide film is formed on the surface of the chromium coating film of the glass forming mold, and a silicon oxide film is formed on the chromium oxide film, whereby the corrosion resistance at a high temperature of the chromium coating film is improved. Accordingly, such a glass forming mold is suitable for molding a molten glass containing a large amount of oxidative substances, such as a panel or a funnel glass for a cathode ray tube which contains e.g. silicon oxide, sodium oxide, potassium oxide, strontium oxide, barium oxide and lead oxide.

Now, the present invention will be described in detail with reference to Examples. However, it should be understood that the present invention is by no means restricted to such specific Examples.

Examples 1 to 9 (Examples 1, 2, 6 and 9 are Comparative Examples, and Examples 3 to 5, 7 and 8 are Examples of the present invention) and the measuring methods are as follows.

1) Si deposition amount: Using a fluorescent X-ray apparatus (RIX 3000, manufactured by Rigaku Denki K.K.), the Si deposition amount within a measured range of 3 cm in diameter of a silicon oxide film, was calculated.

2) Chromium concentration: A powdery substance deposited on the mold was dissolved in pure water, and using an inductively coupled plasma emission spectrochemical analyzer (SPS4000, manufactured by SII), the concentration of chromium contained in the powdery substance was measured by an emission spectrochemical analysis.

3) Surface roughness: Whether or not the surface roughness of the mold is uniform, was visually judged. Symbol "○" means "uniform" and symbol "X" means "non-uniform". For the practical purpose, "○" is preferred.

4) Crystal orientation (peak intensity): Using an X-ray diffraction apparatus (RINT2500, manufactured by Rigaku Denki K.K.), peak intensities at (012), (104) and (110) attributable to a chromium oxide film, were measured. Here, the peak intensities were represented by relative intensities, based on the peak intensity at (104) which was rated to be 100.

Further, the composition of the panel glass for a cathode ray tube used in Examples 1 to 8 was as follows. Silicon oxide: 62.0 mass %, sodium oxide: 7.5 mass %, potassium oxide: 8.1 mass %, strontium oxide: 11.6 mass %, barium oxide: 2.2 mass %, and others including zirconium oxide: 8.6 mass %.

EXAMPLE 1

By means of an electrolytic plating method, a chromium-plated coating film having a thickness of 20 μm, was formed on the molding surface of a mold (for a panel of 29 inches) for forming a panel glass for a cathode ray tube, made of SUS420J2 (JIS-G4303) as the base material of the mold. Using such a mold, forming of a panel glass for a cathode ray tube was carried out for 96 hours, whereupon the concentration of chromium in the powdery substance deposited on the mold, and the surface roughness of the mold, were measured. The results are shown in Table 1.

EXAMPLES 2 to 6

By means of an electrolytic plating method, a chromium-plated coating film having a thickness of 20 μm, was formed on the molding surface of a mold for forming a panel glass for a cathode ray tube, made of SUS420J2 as the base material of the mold. A silicon coating fluid was prepared by adjusting with water so that silicone emulsion SH-490 (manufactured by Toray Dow Corning Co., Ltd.) would be at each concentration in the coating fluid, as identified in Table 1. Such a silicon coating fluid was coated on the surface of the above chromium-plated coating film by means of a spraying method and then heated in air at a temperature of 500° C. for 4 hours, to form a chromium oxide film on the surface of the chromium-plated coating film, and further, a silicon oxide film was formed on the chromium-oxide film. The Si deposition amount of the above silicon oxide film was measured, and then, by means of the above-mentioned mold, forming of a panel glass for a cathode ray tube was carried out for 96 hours, whereupon the concentration of chromium in the powdery substance deposited on the mold, and the surface roughness of the mold, were measured. The results are shown in Table 1.

EXAMPLE 7

By means of an electrolytic plating method, a chromium-plated coating film having a thickness of 20 μm, was formed on the surface of a SUS420J2 plate. A silicon coating fluid was prepared by adjusting with water so that silicone emulsion SH-490 would be 90 mass % in the coating fluid. The silicon coating fluid was coated on the surface of the above chromium-plated coating film by means of a spraying method, and then, the above SUS420J2 plate was heated at a temperature of 500° C. for 4 hours in air, whereby a chromium oxide film was formed on the surface of the chromium-plated coating film, and further, a silicon oxide film was formed on the chromium oxide film.

The Si deposition amount of the above silicon oxide film was measured by a fluorescent X-ray method, and then, the above SUS420J2 plate was heated at a temperature of 800° C. for 30 minutes in air, whereupon the crystal orientation of the chromium oxide film, was measured. The results are shown in Table 2.

EXAMPLE 8

Treatment was carried out in the same manner as in Example 7 except that tetramethoxysilane was used instead of silicone emulsion SH-490 used in Example 7, and the measurements were carried out. The results are shown in Table 2.

EXAMPLE 9

Treatment was carried out in the same manner as in Example 7 except that silicone emulsion SH-490 used in Example 7, was not coated, and the measurements were carried out. The results are shown in Table 2.

TABLE 1

| Test sample | Coating fluid concentration (mass %) | Si deposition amount (μg/cm$^2$) | Chromium concentration (ppm) | Surface roughness |
|---|---|---|---|---|
| Ex. 1 | 0 | 0 | 64 | X |
| Ex. 2 | 1.0 | 0.08 | 47 | X |
| Ex. 3 | 10 | 0.9 | 7.6 | ○ |
| Ex. 4 | 15 | 1.6 | 4.6 | ○ |
| Ex. 5 | 90 | 31 | 2.5 | ○ |
| Ex. 6 | 100 | 350 | 1.6 | X |

TABLE 2

| Test sample | Si deposition amount ($\mu g/cm^2$) | Crystal orientation (peak intensities) | | |
|---|---|---|---|---|
| | | $Cr_2O_3$ (012) | $Cr_2O_3$ (104) | $Cr_2O_3$ (110) |
| Ex. 7 | 30 | 57 | 100 | 45 |
| Ex. 8 | 12 | 59 | 100 | 43 |
| Ex. 9 | 0 | 39 | 100 | 22 |

According to the present invention, it is possible to provide a glass forming mold, whereby high temperature corrosion scarcely proceeds, peeling hardly takes place, and a high temperature molten glass can be formed for a long period of time, and a process for its production, as well as a glass forming method employing such a mold. In the present invention, an inexpensive silicon compound is used, and mass production is possible. Thus, the industrial value of the present invention is high.

The entire disclosure of Japanese Patent Application No. 2001-158881 filed on May 28, 2001 including specification, claims, drawings and summary are incorporated herein by reference in its entirety.

What is claimed is:

1. A glass forming mold comprising a mold having a molding surface, a chromium coating film formed on the molding surface and a silicon oxide film formed on the surface of the chromium coating film in an amount ranging from 0.1 to 300 $\mu g$ of the silicon oxide per $cm^2$ of the silicon oxide film.

2. A glass forming mold comprising a mold having a molding surface, a chromium coating film formed on the molding surface and a silicon oxide film formed on the surface of the chromium coating film via a chromium oxide film, the amount of silicon oxide ranging from 0.1 to 300 $\mu g$ per $cm^2$ of the silicon oxide film.

3. A glass forming mold comprising a mold having a molding surface, and a chromium-plated coating film formed on the molding surface, wherein a chromium oxide film and a silicon oxide film are sequentially formed on the surface of the chromium-plated coating film, the amount of silicon oxide ranging from 0.1 to 300 $\mu g$ per $cm^2$ of the silicon oxide film.

4. The glass forming mold according to claim 1, wherein the amount of silicon oxide ranges from 0.1 to 40 $\mu g$ per $cm^2$ of the silicon oxide film.

5. The glass forming mold according to claim 2, wherein the amount of silicon oxide ranges from 0.1 to 40 $\mu g$ per $cm^2$ of the silicon oxide film.

6. The glass forming mold according to claim 3, wherein the amount of silicon oxide ranges from 0.1 to 40 $\mu g$ per $cm^2$ of the silicon oxide film.

7. A glass forming mold comprising a mold having a molding surface, a chromium coating film formed on the molding surface and a silicon oxide film formed on the surface of the chromium coating film, the thickness of the silicon oxide film ranging from 0.1 to 2 $\mu m$.

8. A glass forming mold comprising a mold having a molding surface, a chromium coating film formed on the molding surface and a silicon oxide film formed on the surface of the chromium coating film, the thickness of the silicon oxide film ranging from 0.1 to 2 $\mu m$.

9. A glass forming mold comprising a mold having a molding surface, a chromium coating film formed on the molding surface and a silicon oxide film formed on the surface of the chromium coating film via a chromium oxide film, the thickness of the silicon oxide film ranging from 0.1 to 2 $\mu m$.

10. The glass forming mold according to claim 2, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

11. The glass forming mold according to claim 3, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

12. The glass forming mold according to claim 5, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

13. The glass forming mold according to claim 6, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

14. The glass forming mold according to claim 8, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

15. The glass forming mold according to claim 9, wherein the chromium oxide film is a chromium oxide film having peaks at (012), (104) and (110) in its X-ray diffraction analysis, wherein, when the peak intensity at (104) is rated to be 100, the peak intensity at (012) is at least 50 and the peak intensity at (110) is at least 40.

* * * * *